Patented May 28, 1935

2,002,963

UNITED STATES PATENT OFFICE 2,002,963

FROZEN CONFECTION

Floyd L. Schade, Kansas City, Kans.

No Drawing. Application July 27, 1932,
Serial No. 625,201

7 Claims. (Cl. 99—16)

This application is a continuation-in-part of my application Serial No. 479,799, filed September 4, 1930.

This invention relates to ice-cream, ices, frozen custard and the like which are termed inclusively frozen confections.

An object of this invention is to provide a palatable frozen confection including certain ingredients and in such proportions as to give an improved texture and certain other desirable improved properties to the article.

Another object of the invention is to provide a frozen confection which may be eaten from the hand, with an improved texture particularly adapted to this type of food article.

Another object of the invention is to provide a mixture capable of being frozen in quiescent state without any tendency of forming objectionable ice crystals during the freezing action, thus making it possible to prepare moulded frozen confections from a liquid or entirely fluid composition poured into suitable moulds rather than from a pasty, semi-frozen mass forced into the moulds.

Still another object of the invention is to produce frozen confections which have a comparatively high solidifying point, thus permitting the frozen confection to be eaten from the hand without the tendency to melt or drip while being so eaten. Other, further and specific purposes will be apparent from the more detailed description which is to follow.

In the manufacture of ice-cream and similar frozen confections, it is the general practice to freeze a potable liquid consisting essentially of milk, sugar and flavoring substance. In order to produce a smooth and homogeneous texture in the frozen mass, it is necessary to prevent supercooling of the mixture by prolonged and vigorous mechanical stirring or beating thereof during the freezing operation, since otherwise, growth of ice crystals will be unavoidable. It has been customary to employ a protective colloid of either the carbohydrate or protein type in such a mixture for the purpose of further diminishing the formation and growth of ice crystals during the process of beating and freezing.

I have found that a carbohydrate colloid-water system, such as sugar and water, can be most effectively stabilized by a carbohydrate type of protective colloid such as agar-agar. Similarly a protein colloid-water system such as milk, can be most effectively stabilized by a protein type of protective colloid such as gelatine. Each of these systems is then in colloidal balance by itself. The addition of the protective colloid in both instances prevents the food particles and flavoring from being separated from the water by formation of coarse ice crystals. However, upon combining these two systems, as is necessary for the production of a palatable frozen confection, the resultant mixture is again colloidally unbalanced because the separate systems composing the same are not colloidally compatible with the result that coarse ice crystals are again formed when the mixture is frozen in a quiescent state. When a confection adapted to be eaten from the hand is so frozen, a product results from which the food particles and flavoring may be sucked out leaving a mass of tasteless ice crystals.

I have found, however, that the mixture of the incompatible colloidal systems as above described can be made to maintain colloidal balance by the use of an agent such as glycerine. Apparently the glycerine in the presence of both proteins, such as gelatine, and carbohydrates, such as agar-agar, forms corresponding glycerosols and thus functions as an intermediary between the protein and the carbohydrate colloid systems to maintain the combination in perfect balance.

At any rate, I have found that the use of such an agent does in fact prevent coagulation or ice crystal formation upon freezing even though stirring or other agitation be omitted; further that if the frozen product containing such agent is permitted to attain a temperature sufficiently high to cause thawing and liquefaction it can be refrozen in its container without formation of objectionable ice crystals.

Furthermore, the effect of the glycerine is to stabilize the sugar-agar hydrosol because of its similar polyhydric constitution and its greater solubility; likewise, by its formation of a glycerosol with gelatine, to raise the melting point of the frozen product sufficiently to prevent any marked tendency of the product to melt or drip while being eaten; and still further to prevent gradual diminution in the melting point of the product which otherwise takes place.

A specific example including the features of my invention and illustrating the manner in which it may be carried out will now be described.

Eight ounces of gelatine are added to two gallons of tap water. After the gelatine has been permitted to soften, two gallons of warm water are added and the whole is stirred well until the gelatine is thoroughly dissolved. There is then added eighteen pounds of sugar, twenty-four pounds condensed milk, four ounces glycerine, three ounces agar-agar, one-fourth ounce salt and extracts or other flavoring as may be desired. After the ingredients are mixed thoroughly there may be added ten pounds of crushed fruit or other comminuted food solids such as pineapples, bananas, peaches, maraschino cherries, shredded cocoanut or nuts. Sufficient water is added to bring the volume to fifteen gallons. The mixture may then be placed as by pouring, into any suitable container or into individual moulds of desired size and configuration and frozen solid without agitation. The frozen product may be impaled on a suitable handle to permit of its being eaten from the hand.

The result is a confection which is palatable and which has a decidedly improved texture. Further, the product has the improved characteristic in that under the normal conditions of consumption it will not drip in the manner of ordinary ice or ice-cream.

The various ingredients remain thoroughly mixed and the composition retains its homogeneity while freezing and no tasteless ice crystals result from the freezing, the product being homogeneous throughout.

The frozen product may also be coated with molten fluid substance as by dipping it in a chocolate syrup or similar composition. Because of the higher melting point of the frozen product made in accordance with my invention, this operation of providing the confection with molten or heat liquefied edible coatings is attained with less difficulty than is usual.

It will be understood of course, that considerable variation may be made in the ingredients while still retaining in a large measure the benefits of the invention. Raw milk, or milk powder in aqueous suspension may be substituted for the condensed milk and the quantity of milk may be varied, although in the specific example above described, the proportions of the other ingredients have been substantially fixed with respect to the amount of milk indicated above, since there is particular utility in using these proportions.

The amount of comminuted food solids may be varied or they may be left out entirely. Chocolate may be added in proper proportion in place of the fruit.

In lieu of the agar-agar, other colloids such as dextrin, starch, gum-acacia or gum-tragacanth, in suitable proportions may be employed. Similarly, other protein protective colloids, such as egg albumin or gluten may be substituted in suitable proportions for the gelatine.

While I have found glycerine to be an effective intermediate agent for the purpose of accomplishing the objects of my invention and while this material is the most available for the purposes herein described, other polyhydric alcohols such as mannitol or mannite which is very widely distributed in the vegetable kingdom and which is formed in the lactic acid fermentation of sugar, may be employed in suitable proportions in lieu of the glycerine.

Due to the presence of the glycerine it is possible to reduce the proportion of agar-agar to a minimum, this being desirable on account of its mild laxative action. With the addition of milk in the proportions suggested, the mild laxative action of the agar-agar merely serves to counteract the astringent properties of the milk.

It is to be understood therefore that while the proportions of ingredients suggested in the example above given are of particular utility, valuable advantages inherent in the invention may be obtained by the omission of some of the ingredients and by the use of ingredients in substantially varying proportions. The invention is therefore not to be construed as limited to the precise ingredients or to the exact proportions illustrated and described, but within the scope of the appended claims, may vary within wide range.

I claim as my invention:

1. A frozen confection including a potable liquid, containing milk and sugar and having added thereto, agar-agar, gelatine and glycerine.

2. A frozen confection including a potable liquid, containing milk and sugar and having added thereto, agar-agar, gelatine, and glycerine substantially in proportions of eight ounces of gelatine, four ounces of glycerine and three ounces of agar-agar, to fifteen gallons of said liquid.

3. A frozen confection including a potable liquid, containing milk and sugar and having added thereto, agar-agar, sugar, gelatine and glycerine, the proportions of the material being such as to permit freezing in a quiescent state without stirring and without the formation of ice crystals.

4. In the process of freezing confections without stirring, the steps which consist in combining milk and sugar with a relatively small proportion of gelatine and a relatively small proportion of agar-agar and glycerine, and subjecting the mixture to freezing without agitation.

5. A composition for forming a frozen confection comprising a potable liquid, including milk and sugar, a protein-type protective colloid for stabilizing the milk against crystal formation during freezing, a carbohydrate-type protective colloid for stabilizing the sugar against crystal formation during freezing, and a polyhydric alcohol functioning to render the sugar-system and the milk-system mutually, colloidally compatible, whereby said mixture is capable of being frozen in a quiescent state without the formation of ice crystals.

6. In the process of making frozen confections, the steps which comprise combining a potable liquid including milk and sugar with a protein-type protective colloid and a carbohydrate-type protective colloid and a polyhydric alcohol adapted to render said colloid systems compatible, whereby to prevent formation of ice crystals upon freezing same in a quiescent state, and freezing said mixture in a quiescent state.

7. A frozen confection including a potable liquid, comprising milk and sugar having added thereto, a protein-type protective colloid, a carbohydrate-type protective colloid and glycerine.

FLOYD L. SCHADE.